(12) United States Patent
Debras

(10) Patent No.: US 6,291,601 B1
(45) Date of Patent: Sep. 18, 2001

(54) PRODUCTION OF POLYETHYLENE HAVING A BROAD MOLECULAR WEIGHT DISTRIBUTION

(75) Inventor: Guy Debras, Frasnes Lez Gosselies (BE)

(73) Assignee: Fina Research, S.A., Feluy (BE)

( * ) Notice: Subject to any disclaimer, the term of this patent is extended or adjusted under 35 U.S.C. 154(b) by 0 days.

(21) Appl. No.: 09/537,885

(22) Filed: Mar. 29, 2000

(30) Foreign Application Priority Data

Mar. 29, 1999 (EP) .................................................. 99106378

(51) Int. Cl.⁷ ................................ C08F 2/14; C08F 10/02
(52) U.S. Cl. ................................ 526/64; 526/65; 526/73; 526/88; 526/116; 526/348.5; 526/905
(58) Field of Search .................................. 526/64, 65, 88, 526/73, 116, 905

(56) References Cited

U.S. PATENT DOCUMENTS

| 5,276,115 | 1/1994 | Bohmer et al. | 526/126 |
| 5,639,834 | * 6/1997 | Debras et al. | 526/65 X |
| 5,739,220 | 4/1998 | Shamshoum et al. | 526/79 |

FOREIGN PATENT DOCUMENTS

| 0288226 | 10/1987 | (EP) . |
| 0881237 | 12/1998 | (EP) . |
| 9858001 | 12/1998 | (WO) . |

* cited by examiner

*Primary Examiner*—Fred Teskin
(74) *Attorney, Agent, or Firm*—William D. Jackson

(57) ABSTRACT

A process for producing high density polyethylene in the presence of a metallocene catalyst system in two liquid full loop reactors in series, wherein in a first reactor a first polyethylene product is polymerized substantially by homopolymerization of ethylene and hydrogen, and in a second reactor serially connected to the first reactor downstream thereof a second polyethylene product is copolymerized from ethylene and an alpha-olefinic comonomer comprising from 3 to 8 carbon atoms, and a hydrogenation catalyst is introduced into the reactants downstream of the first reactor, the hydrogenation catalyst comprising a second metallocene catalyst of general formula:

$$Cp_2MX_n$$

where Cp is a substituted or unsubstituted cyclopentene dienyl group; M is a transition metal from Group IVB of the Periodic Table or vanadium; X is a halogen or a hydrocarbyl group having from 1 to 10 carbon atoms; and n is the valency of the metal M minus 2.

10 Claims, No Drawings

PRODUCTION OF POLYETHYLENE HAVING A BROAD MOLECULAR WEIGHT DISTRIBUTION

The present invention relates to a process for the production of polyethylene in particular high density polyethylene (HDPE) having a bimodal molecular weight distribution.

For polyethylene, and for high density polyethylene (HDPE) in particular, the molecular weight distribution (MWD) is a fundamental property which determines the properties of the polymer, and thus its applications. It is generally recognised in the art that the molecular weight distribution of a polyethylene resin can principally determine the physical, and in particular the mechanical, properties of the resin and that the provision of different molecular weight polyethylene molecules can significantly affect the rheological properties of the polyethylene as a whole.

Since an increase in the molecular weight normally improves the physical properties of polyethylene resins, there is a strong demand for polyethylene having high molecular weight. However, it is the high molecular weight molecules which render the polymers more difficult to process. On the other hand, a broadening in the molecular weight distribution tends to improve the flow of the polymer when it is being processed at high rates of shear. Accordingly, in applications requiring a rapid transformation employing quite high inflation of the material through a die, for example in blowing and extrusion techniques, the broadening of the molecular weight distribution permits an improvement in the processing of polyethylene at high molecular weight (this being equivalent to a low melt index, as is known in the art). It is known that when the polyethylene has a high molecular weight and also a wide molecular weight distribution, the processing of the polyethylene is made easier as a result of the low molecular weight portion and also the high molecular weight portion contributes to a good impact resistance for the polyethylene film. A polyethylene of this type may be processed utilising less energy with higher processing yields.

The molecular weight distribution can be completely defined by means of a curve obtained by gel permeation chromatography. Generally, the molecular weight distribution is defined by a parameter, known as the dispersion index D, which is the ratio between the average molecular weight by weight (Mw) and the average molecular weight by number (Mn). The dispersion index constitutes a measure of the width of the molecular weight distribution. For most applications, the dispersion index varies between 10 and 30.

It is known in the art that it is not possible to prepare a polyethylene having a broad molecular weight distribution and the required properties simply by mixing polyethylenes having different molecular weights.

As discussed above, high density polyethylene consists of high and low molecular weight fractions. The high molecular weight fraction provides good mechanical properties to the high density polyethylene and the low molecular weight fraction is required to give good processability to the high density polyethylene, the high molecular weight fraction having relatively high viscosity which can lead to difficulties in processing such a high molecular weight fraction. In a bimodal high density polyethylene, the mixture of the high and low melting weight fractions is adjusted as compared to a monomodal distribution so as to increase the proportion of high molecular weight species in the polymer. This can provide improved mechanical properties.

It is accordingly recognised in the art that it is desirable to have a bimodal distribution of molecular weight in the high density polyethylene. For a bimodal distribution a graph of the molecular weight distribution as determined for example by gel permeation chromatography, may for example include in the curve a "shoulder" on the high molecular weight side of the peak of the molecular weight distribution.

The manufacture of bimodal polyethylene is known in the art. It is known in the art that in order to achieve a bimodal distribution, which reflects the production of two polymer fractions, having different molecular weights, two catalysts are required which provide two different catalytic properties and establish two different active sites. Those two sites in turn catalyse two reactions for the production of the two polymers to enable the bimodal distribution to be achieved. Currently, as has been known for many years, as exemplified by EP-A-0057420, the commercial production of bimodal high density polyethylene is carried out by a two step process, using two reactors in series. In the two step process, the process conditions and the catalyst can be optimised in order to provide a high efficiency and yield for each step in the overall process.

In the applicant's earlier WO-A-95/10548 and WO-A-95/11930, it was proposed to use a Ziegler-Natta catalyst to produce polyethylene having a bimodal molecular weight distribution in a two stage polymerisation process in two liquid full loop reactors in series. In the polymerisation process, the comonomer is fed into the first reactor and the high and low molecular weight polymers are produced in the first and second reactors respectively. The introduction of comonomer into the first reactor leads to the incorporation of the comonomer into the polymer chains in turn leading to the relatively high molecular weight fraction being formed in the first reactor. In contrast, no comonomer is deliberately introduced into the second reactor and instead a higher concentration of hydrogen is present in the second reactor to enable the low molecular weight fraction to be formed therein.

These prior processes suffer from the technical disadvantage that some unreacted comonomer can pass through from the first reactor to the second reactor thereby to react with the ethylene monomer therein leading to an increase in the molecular weight of the fraction produced in the second reactor. This in turn can deteriorate the bimodality of the molecular weight distribution of the combined high and low molecular weight polymers leading to a reduction in mechanical properties.

WO-A-98/58001 discloses an olefin polymerisation process comprising at least two polymerisation stages without the need for certain interstage reaction mixture treatment steps wherein in an earlier stage an olefin polymerisation is effected in the presence of hydrogen and a rapidly hydrogen consuming catalyst to produce a relatively lower molecular weight (higher melt flow) polymer and in a later stage an olefin polymerisation is effected whereby to produce a relatively lower melt flow rate polymer. It is disclosed that the process allows comonomer incorporation even when hydrogen is used and moreover the problem of removal of unreacted hydrogen or comonomer between the earlier and later polymerisation stages can be avoided.

EP-A-0881237 discloses a process for producing bimodal polyolefins with metallocene catalysts using two reaction zones.

U.S. Pat. No. 5276115 discloses a process for the polymerisation of olefins in the presence of hydrogen comprising contacting the olefin, a cyclopentadienyl compound and a catalyst comprising a transmission metal compound at polymerisation conditions. The polymerisation may be carried out in series reactors. A cyclopentadienyl compound can be introduced into the second reactor without prior removal of remaining hydrogen which was introduced into the first reactor. The polymerisation catalyst comprises a Ziegler-Natta catalyst.

EP-A-0288226 discloses a process for adjusting the melt flow of olefin polymer products in which a hydrogenation catalyst is employed to reduce the melt flow of the polymer products.

U.S. Pat. No. 5,739,220 discloses an olefin polymerisation process in which at least two introductions of hydrogen are made during the olefin polymerisation reaction. Suitable catalysts include metallocenes and conventional Ziegler-Natta catalysts blended with or modified by such metallocenes. It is disclosed that the catalyst system is bifunctional in that it functions both as a polymerisation catalyst and has a hydrogenation catalyst.

The present invention aims to provide a process for producing polyethylene having a large molecular weight distribution, and in particular a bimodal molecular weight distribution, which overcomes or at least mitigates some of the problems in the prior art discussed above.

Accordingly, the present invention provides a process for producing high density polyethylene in the presence of a metallocene catalyst system in two liquid full loop reactors in series, wherein in a first reactor a first polyethylene product is polymerised substantially by homopolymerisation of ethylene and hydrogen, and in a second reactor serially connected to the first reactor downstream thereof a second polyethylene product is copolymerised from ethylene and an alpha-olefinic comonomer comprising from 3 to 8 carbon atoms, and a hydrogenation catalyst is introduced into the reactants downstream of the first reactor, the hydrogenation catalyst comprising a second metallocene catalyst of general formula:

$$Cp_2MX_n$$

where Cp is a substituted or unsubstituted cyclopentene dienyl group; M is a transition metal from Group IVB of the Periodic Table or vanadium; X is a halogen or a hydrocarbyl group having from 1 to 10 carbon atoms; and n is the valency of the metal M minus 2.

Preferably, the hydrogenation catalyst is introduced into the process stream passing from the first reactor to the second reactor.

The degree of copolymerisation in the first reactor is preferably limited to an amount whereby the first polyethylene product has a density of not less than 0.960 g/cc.

The present invention is predicated on the surprising discovery by the present inventor that the production of, respectively, low and high molecular weight fractions of a polyethylene in first and second reactors of two liquid full loop reactors in series can unexpectedly yield high density polyethylene having a bimodal molecular weight distribution with improved mechanical properties.

Without being bound by theory, it is believed that this unexpected technical effect results from the absence, or presence in only minor amounts, of comonomer in the first reactor, leading to reliable polymerisation of the low molecular weight polyethylene fraction therein, and the addition of substantial comonomer to the second reactor in conjunction with the consumption of hydrogen prior to or entering the second reactor to form ethane as a result of the addition of the hydrogenation catalyst, leads to reliable copolymerisation of the high molecular weight polyethylene fraction having good mechanical properties.

In the preferred process of the present invention, the homopolymerisation and copolymerisation processes are carried out in the liquid phase in an inert diluent, the reactants comprising ethylene and hydrogen for homopolymerisation and for copolymerisation ethylene and an alpha-olefinic comonomer comprising from 3 to 8 carbon atoms. The comonomer may be selected from 1-butene, 1-pentene, 1-hexene, 4-methyl 1-pentene, 1-heptene and 1-octene. The inert diluent may comprise isobutane.

The homopolymerisation and copolymerisation processes are preferably carried out at a temperature of from 50 to 120° C., more preferably from 60 to 110° C., under an absolute pressure of 1 to 100 bar. Typically, the homopolymerisation in the first reactor is carried out at a higher temperature than the copolymerisation in the second reactor.

In the first reactor, the ethylene monomer preferably comprises from 0.1 to 8% by weight based on the total weight of the ethylene monomer in the inert diluent and the hydrogen comprises from 0.1 to 2 mol % on the same basis. A particularly preferred composition in the first reactor comprises around 7% by weight ethylene. If a minor degree of copolymerisation is also carried out in the first reactor, an alpha-olefnic comonomer as described above is also introduced into the first reactor. The proportion of comonomer introduced is limited to an amount whereby the density of the polyethylene produced in the first reactor is at least 0.96 g/cc. The polymerisation product from the first reactor preferably has a melt index MI2 of from 5 to 200 g/10 min, more preferably from 25 to 100 g/10 min, the melt index Mi2 being measured determined using the procedures of ASTM D1238 using a load of 2.16 kg at a temperature of 190° C. The melt index MI2 is broadly inversely indicative of the molecular weight of the polymer. In other words, a low melt index is indicative of a high molecular weight for the polyethylene and vice versa. Typically, the polyethylene produced in the first reactor has a density of over 0.96 g/cc, more typically around 0.97 g/cc. Preferably, the low molecular weight polyethylene fraction produced in the first reactor comprises from 30 to 70% by weight, more typically around 40 to 60% by weight, of the total polyethylene produced in the first and second serially connected reactors.

In the second reactor, the comonomer as described above is introduced in substantial amounts, as compared to the first reactor, into the second reactor and in addition a hydrogenation catalyst, having a low activity with respect to the polymerisation of polyethylene, is introduced downstream of the first reactor, preferably into the process stream passing from the first reactor to the second reactor. The hydrogenation catalyst acts to consume hydrogen gas in that process stream thereby to form ethane, thereby in turn to reduce the hydrogen concentration in the second reactor, preferably substantially to zero. Accordingly, in the copolymerisation process carried out in the second reactor, the comonomer, which is typically 1-hexene, is reacted with the ethylene monomer to form a high molecular weight polyethylene fraction in the second reactor in a controllable manner.

Preferably, the temperature in the second reactor is lower than that in the first reactor, for example the temperature is 70 to 80° C. in the second reactor as opposed to 80 to 100° C. in the first reactor. In the second reactor, the ethylene monomer preferably comprises from 0.1 to 10% by weight, typically around 9% by weight, and the comonomer comprises from 1 to 6% by weight, typically around 5% by weight, each based on the total weight of the monomer and comonomer in the inert diluent.

The hydrogenation catalyst comprises a metallocene catalyst of general formula:

$$Cp_2MX_n$$

where Cp is a substituted or unsubstituted cyclopentene dienyl group; M is a transition metal from Group IVB of the Periodic Table or vanadium; X is a halogen or a hydrocarbyl group having from 1 to 10 carbon atoms; and n is the valency of the metal M minus 2.

A particularly preferred metallocene catalyst comprises $Cp_2TiCl_2$.

The metallocene catalyst is injected into the process stream in a preferred amount of from 2 to 50 ppm by weight, more preferably from 2 to 20 ppm based on the weight of the inert diluent.

The final polyethylene, comprising in admixture the low molecular weight polyethylene fraction produced in the first reactor and conveyed through the second reactor and the high molecular weight polyethylene fraction produced in the second reactor, preferably has a high load melt index (HLMI), determined using the procedures of ASTM D1238 using a load of 21.6 kg at a temperature of 190° C., of from 5 to 40 g/10 mins, more preferably from 5 to 10 g/10 mins. Preferably, the final product has a shear response (SR2), this being a ratio between the HLMI and the MI2 values and representative of the processability of the polyethylene resins produced in accordance with the process of the invention, of from 50 to 180, more preferably from 60 to 130. Preferably, the final product has a density of from 0.935 to 0.959 g/cc, more preferably from 0.940 to 0.950 g/cc. The final product may have a molecular weight distribution MWD (the ratio of $M_w/M_n$) of from 10 to 20.

It has been found that the process of the present invention can yield bimodal high density polyethylenes having properties which make them particularly suitable for use as polyethylene resins for the manufacture of pipes. Since no comonomer is incorporated into the low molecular weight fraction, even if the polymer as a whole has the same molecular weight distribution as in a known polymer the resultant polymer can have improved mechanical properties. Thus the clear distinction in the production of the low and high molecular weight fractions in the process of the invention gives improved bimodality of the molecular weight distribution which in turn improves the mechanical properties such as the impact resistance of the polyethylene resin when used for pipes.

Any metallocene in the art known as suitable for the polymerisation of olefins can be used in the present invention.

The metallocene catalyst is preferably a metallocene-alumoxane supported catalyst prepared as follows:

a) reacting a metallocene with an alumoxane at a temperature of from 15 to 50° C.;

b) recovering from step a) a mixture comprising an alkylmetallocenium cation and an anionic alumoxane oligomer;

c) reacting the mixture from step b) with a support at a temperature of from 85 to 110° C.; and d) recovering a supported metallocene-alumoxane catalyst as a free flowing catalyst.

The preferred metallocenes can be represented by the general formulae:

$$(Cp)_m MR_n X_q \quad (1)$$

wherein Cp is a cyclopentadienyl ring, M is a group 4b, 5b or 6b transition metal, R is a hydrocarbyl group or hydrocarboxy having from 1 to 20 carbon atoms, X is a halogen, and m=1–3, n=0–3, q=0–3, and the sum of m+n+q is equal to the oxidation state of the metal,

$$(C_5R'_k)_g R''_s (C_5R'_k) MQ_{3-g} \quad (2)$$

or

$$R'_s (C_5R'_k)_2 MQ' \quad (3)$$

wherein $(C_5R'_k)$ is a cyclopentadienyl or substituted cyclopentadienyl, each R' being the same or different and is hydrogen or a hydrocarbyl radical such as alkyl, alkenyl, aryl or arylalkyl radical containing from 1 to 20 carbon atoms or two carbon atoms joined together to form a $C_4$–$C_6$ ring, R'' is a $C_1$–$C_4$ alkylene radical, a dialkyl germanium or silicon or siloxane, or an alkyl phosphine or amine radical bridging two $(C_5R'_k)$ rings, Q is a hydrocarbyl radical such as aryl, alkyl, alkenyl, alkyl aryl or aryl alkyl radical having from 1 to 20 carbon atoms, hydrocarboxy radical having from 1 to 20 carbon atoms or halogen and can be the same or different from each other, Q' is an alkylidene radical having from 1 to 20 carbon atoms, s is 0 or 1, g is 0, 1 or 2, s is 0 when g is 0, k is 4 when s is 1 and k is 5 when s is 0, and M is as defined above.

Exemplary hydrocarbyl radicals are methyl, ethyl, proyl, butyl, isobutyl, amyl, isoamyl, hexyl, heptyl, octyl, nonyl, decyl, cetyl, 2-ethylhexyl, phenyl and the like.

Exemplary halogen atoms include chlorine, bromine, fluorine and iodine and of these halogen atoms, chlorine is preferred.

Exemplary hydrocarboxy radicals are methoxy, ethoxy, propoxy, butoxy, amyloxy and the like. Exemplary alkylidene radicals are methylidene, ethylidene and propylidene.

Particularly preferred metallocenes for use in the present invention, are:

(bisindenyl)ethane(zirconium dichloride)
(bisindenyl)ethane(hafnium dichloride)
dimethylsilyl(bisindenyl) (zirconium dichloride)
isopropylidene(cyclopentadienyl fluorenyl) (zirconium dichloride)
diphenyl methylidene(cyclopentadienyl fluorenyl) (zirconium dichloride)
(biscyclopentadienyl) (zirconium dichloride)
and (bismethylcyclopentadienyl) (zirconium dichloride).

The alumoxanes known in the art can be used in the present invention.

The preferred alumoxanes comprise oligomeric linear and/or cyclic alkyl alumoxanes represented by the formula:

$$R\text{---}(Al\text{---}O)_{\overline{n}}\text{---}AlR_2 \quad (4)$$
$$\phantom{R\text{---}(}R$$

for oligomeric, linear alumoxanes and

$$(Al\text{---}O)_m \quad (5)$$
$$\phantom{(}R$$

for oligomeric, cyclic alumoxanes wherein n is from 1 to 40, preferably from 10 to 20, m is from 3 to 40, preferably from 3 to 20 and R is a $C_1$–$C_8$ alkyl group and preferably methyl. Generally, in the preparation of alumoxanes from, for example, trimethyl aluminum and water, a mixture of linear and cyclic compounds is obtained.

Methylalumoxane is preferably used.

The alumoxane is usually delivered as a concentrated solution of alumoxane in toluene.

The support used in the metallocene catalyst can be selected from any organic or inorganic solids, particularly porous supports such as talc, inorganic oxides, and resinous support material such as polyolefin. Preferably, the support material is an inorganic oxide in its finely divided form.

Suitable inorganic oxide materials, which are desirably employed in accordance with this invention, include Group 2a, 3a, 4a and 4b metal oxides such as silica, alumina and mixtures thereof. Other inorganic oxides that may be employed either alone or in combination with the silica, or alumina, are magnesia, titania, zirconia, and the like. Other suitable support materials, however, can be employed, for example, finely divided functionalized polyolefins such as finely divided polyethylene.

Preferably, the support is a silica having a surface area of from 200 to 600 $m^2/g$ and a pore volume of 0.5 to 3 $cm^3/g$.

The reaction between the metallocene and the alumoxane is a multi-step equilibrium type reaction involving mono- and di-alkylation of the metallocene, mono-, di- or multi-metallic species and finally abstraction of an alkyl group, and formation of active cationic species. This reaction is performed at a temperature of from 15 to 50° C., preferably about 25° C. and is conducted in the presence of a solvent, preferably toluene. The amounts of alumoxane and metallocene can vary in order to define an aluminum to transition metal mole ratio ranging from 1:1 to 100:1, and preferably, ranging from 5:1 to 50:1. The mixture alkylmetallocenium cation-anionic alumoxane oligomer is added to the support material slurried in a suitable hydrocarbon solvent. Preferred solvents include mineral oils and the various hydrocarbons which are liquid at the temperature and pressure conditions employed and which do not react with the individual ingredients.

The process of the invention will now be described in greater detail with reference to the following non-limiting Example and with reference to the accompanying drawing in which:

EXAMPLE 1

The process of the present invention was carried out in two serially connected liquid full loop reactors. In the first reactor, ethylene was polymerised with hydrogen in the presence of isobutane as a inert diluent and the amounts of the ethylene and hydrogen are specified in Table 1. No comonomer was present. The catalyst comprised a metallocene catalyst of composition Et $(Ind\ H_4)_2ZrCl_2$ on a silica support treated with methyl alumoxane.

The properties of the polyethylene resin produced by reactor 1 were analysed and it may be seen from Table 1 that the polyethylene resin had a melt index MI2 of around 55.5 g/10 mins, this representing a relatively low molecular weight for the polymer, yet a relatively high density of around 0.967 g/cc. Reactor 1 produced around 56% by weight of the total amount of the final polyethylene resin product produced by both reactor 1 and reactor 2.

The polymerisation was carried out at a temperature of around 100° C. and at a pressure of around 42 bar.

Thereafter, the process stream, including the polyethylene resin produced in the first reactor and the catalyst, was conveyed to the second reactor which was operated under polymerisation conditions having a lower temperature, of around 70° C., than that employed in the first reactor and a lower pressure of less than 42 bar. Prior to entry into the second reactor, a metallocene catalyst, in particular $Cp_2TiCl_2$, was introduced into the process stream in the amount specified in Table 1. It may be seen from Table 1 that this addition of the metallocene catalyst caused hydrogenation of the ethylene by the hydrogen content in the process stream thereby to form ethane, whereby in the second reactor there was no hydrogen remaining. A comonomer in the form of 1-hexene was introduced into the second reactor in the amount specified in Table 1.

The polymerisation process in the second reactor produced a relatively high molecular weight polyethylene fraction. In Table 1 the properties of the final product are specified. A gel permeation chromatograph (GPC) of the final resin was obtained indicating that the final resin had a bimodal molecular weight distribution.

TABLE 1

|  | EXAMPLE 1 |
| --- | --- |
| Reactor 1 | |
| Temp (° C.) | 100 |
| $C_2$ (wt %) | 6.8 |
| $C_6$ (wt %) | 0 |
| $H_2$ (Nl) | 5 |
| % Reactor 1 | 56 |
| Fluff Reactor 1 | |
| $MI_2$ (g/10') | 55 |
| Density (g/cc) | 0.967 |
| Mn (kDa) | 12.7 |
| MW (kDa) | 40.5 |
| MWD | 3.2 |
| Reactor 2 | |
| Temp (° C.) | 70 |
| $Cp_2TiCl_2$ (ppm) | 10 |
| $C_2$ (wt %) | 9 |
| $C_6$ (wt %) | 4.88 |
| $H_2$ (Nl) | 0 |
| % Reactor 2 | 44 |
| Final Product | |
| HLMI (g/10') | 6.6 |
| Density (g/cc) | 0.94 |
| Mn (kDa) | 22.7 |
| Mw (kDa) | 234 |
| MWD | 10.3 |

What is claimed is:

1. A process for producing high density polyethylene in the presence of a metallocene catalyst system in two liquid full loop reactors in series, wherein in a first reactor a first polyethylene product is polymerised substantially by homopolymerisation of ethylene and hydrogen, and in a second reactor serially connected to the first reactor downstream thereof a second polyethylene product is copolymerised from ethylene and an alpha-olefinic comonomer comprising from 3 to 8 carbon atoms, and a hydrogenation catalyst is introduced into the reactants downstream of the first reactor, the hydrogenation catalyst comprising a second metallocene catalyst of general formula:

$Cp_2MX_n$ where Cp is a substituted or unsubstituted cyclopentene dienyl group; M is a transition metal from Group IVB of the Periodic Table or vanadium; X is a halogen or a hydrocarbyl group having from 1 to 10 carbon atoms; and n is the valency of the metal M minus 2.

2. A process according to claim 1 wherein the hydrogenation catalyst is introduced into the process stream passing from the first reactor to the second reactor.

3. A process according to claim 1 wherein the hydrogenation catalyst comprises $Cp_2TiCl_2$ wherein Cp is a substituted or unsubstituted cyclopentene dienyl group.

4. A process according to claim 1 wherein in the first reactor there is a minor degree of copolymerisation of ethylene with an alpha-olefinic comonomer comprising from 3 to 8 carbon atoms.

5. A process according to claim 4 wherein the degree of copolymerisation in the first reactor is limited to an amount whereby the first polyethylene product has a density of not less than 0.960 g/cc.

6. A process according to claim 1 wherein the comonomer comprises 1-hexene.

7. A process according to claim 1 wherein the homopolymerisation and copolymerisation processes are carried out at a temperature of from 60 to 110° C., under an absolute pressure of 1 to 100 bar, and the homopolymerisation in the first reactor is carried out at a higher temperature than the copolymerisation in the second reactor.

8. A process according to claim 1 wherein in the first reactor, the ethylene monomer comprises from 0.1 to 8% by weight based on the total weight of the ethylene monomer in an inert diluent and the hydrogen comprises from 0.1 to 2 mol % on the same basis.

9. A process according to claim 1 wherein the low molecular weight polyethylene fraction produced in the first reactor comprises from 30 to 70% by weight of the total polyethylene produced in the first and second serially connected reactors.

10. A process according to claim 1 wherein in the second reactor the ethylene monomer comprises from 0.1 to 10% by weight, and the comonomer comprises from 1 to 6% by weight, each based on the total weight of the monomer and comonomer in an inert diluent.

* * * * *